(12) United States Patent
Stimson et al.

(10) Patent No.: US 6,502,745 B1
(45) Date of Patent: *Jan. 7, 2003

(54) PRE-PAID CARD SYSTEM AND METHOD

(75) Inventors: Charles J. Stimson, Fairview; Brady S. Beshear, Garland, both of TX (US)

(73) Assignee: Call Processing, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/008,885

(22) Filed: Jan. 20, 1998

Related U.S. Application Data

(63) Continuation-in-part of application No. 08/751,499, filed on Nov. 18, 1996, now Pat. No. 5,721,768, which is a continuation of application No. 08/407,094, filed on Mar. 20, 1995, now Pat. No. 5,577,109, which is a continuation-in-part of application No. 08/254,237, filed on Jun. 6, 1994, now Pat. No. 5,511,114.

(51) Int. Cl.$^7$ .............................................. G06F 17/00
(52) U.S. Cl. ........................ 235/375; 235/380; 235/383; 235/492
(58) Field of Search ................................ 235/375, 380, 235/492, 383

(56) References Cited

U.S. PATENT DOCUMENTS

| | | | | |
|---|---|---|---|---|
| 5,511,114 A | * | 4/1996 | Stimson et al. ............. | 379/114 |
| 5,696,908 A | * | 12/1997 | Muehlberger et al. ...... | 235/380 |
| 5,708,422 A | * | 1/1998 | Blonder et al. ............ | 340/5.41 |
| 5,721,768 A | * | 2/1998 | Stimson et al. ............. | 379/114 |
| 5,749,075 A | * | 5/1998 | Toader et al. ................ | 705/14 |
| 5,825,863 A | * | 10/1998 | Walker ....................... | 379/144 |
| 5,838,774 A | * | 11/1998 | Weisser, Jr. ............... | 379/92.02 |

FOREIGN PATENT DOCUMENTS

JP        403198194    * 8/1991

\* cited by examiner

*Primary Examiner*—Michael G. Lee
*Assistant Examiner*—Seung Ho Lee
(74) *Attorney, Agent, or Firm*—David H. Judson

(57) ABSTRACT

A pre-paid card system enables customers to make purchases, calls, and to participate in a survey using an authorized card. The system includes four main functional components: a plurality of cards, a host computer, a plurality of on-site activation terminals and a main processor. Each of the cards having a security number associated therewith. The card is typically formed of cardboard, paper or plastic and may include the security number in cleartext under a suitable blackout. The main management and processing of the system is effected by the host computer. The host includes a database for storing security numbers associated with authorized cards. The data terminals are remote from the host computer and connectable thereto for transmitting data between the terminals and the host computer. The processor is controlled by the host computer for enabling customer purchases using the authorized cards. A customer survey may be selectively initiated and dynamically modified by the system depending on a number of system and customer-specific criteria. Survey responses are recorded and processed by the system. The customer may receive a credit or other consideration for participating in the survey.

10 Claims, 3 Drawing Sheets

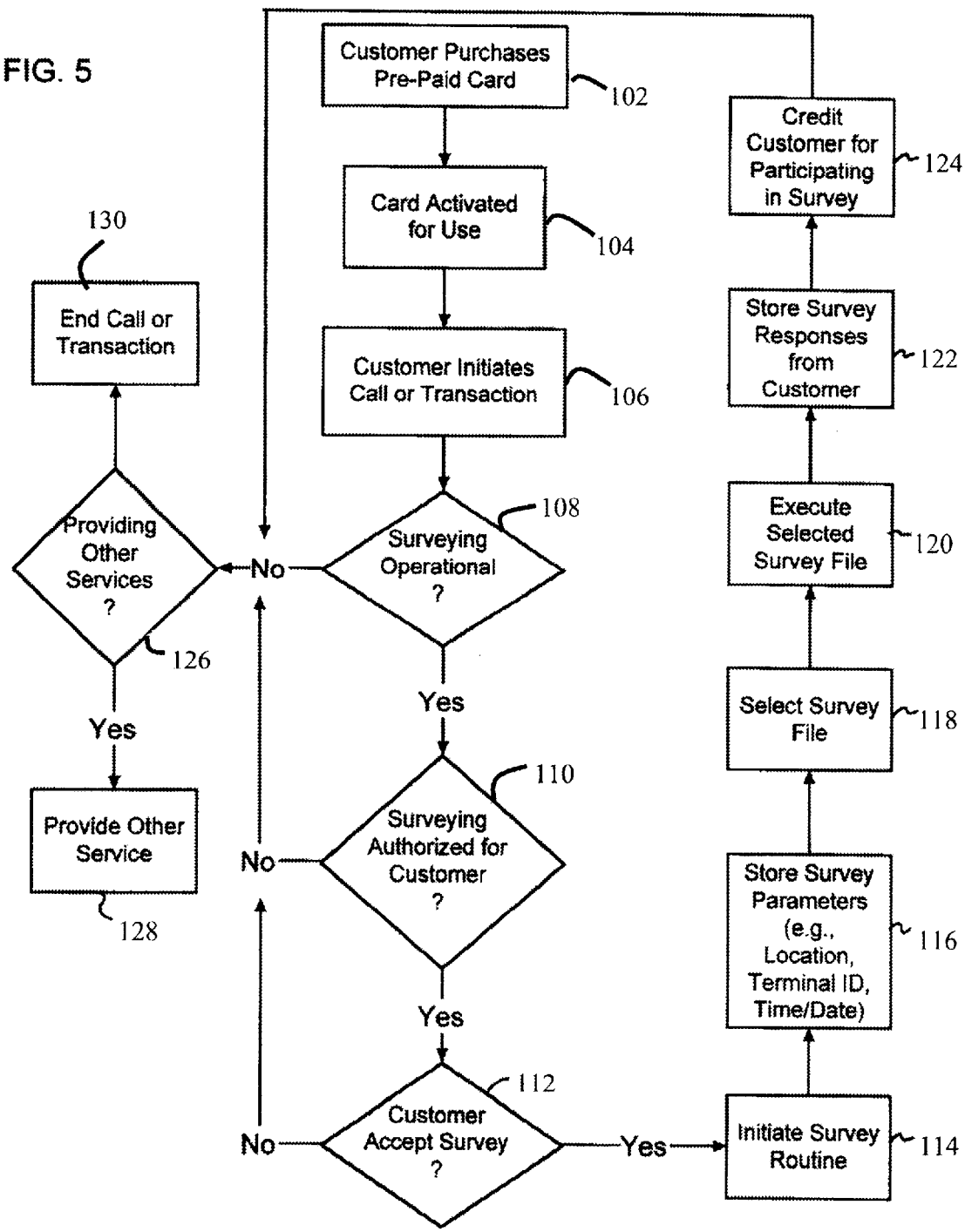

PRE-PAID CARD SYSTEM AND METHOD

RELATED APPLICATIONS

This application is a continuation-in-part of prior application Ser. No. 08/751,499, filed Nov. 18, 1996, now U.S. Pat. No. 5,721,768, which application was a continuation of prior application Ser. No. 08/407,094, filed Mar. 20, 1995, now U.S. Pat. No. 5,577,109, which application was a continuation-in-part of prior application Ser. No. 08/254,237, filed Jun. 6, 1994, now U.S. Pat. No. 5,511,114.

TECHNICAL FIELD

The present invention relates generally to pre-paid services and more particularly to a pre-paid card system having remote terminals to provide on-site activation and recharging of cards in customer-defined amounts, and to provide surveying of customers at the time of card usage.

BACKGROUND OF THE INVENTION

A conventional technique of conducting customer surveys typically involves providing a customer with a number of questions concerning a product or service and manually recording the customer's responses. Such manual surveying approaches are both labor intensive and expensive. The manually derived response data must typically be input into a database and may be subject to varying degrees of modification due to human interpretation and error.

Electronic surveying techniques are typically less expensive and error prone than manual approaches. Such electronic techniques, however, are typically incapable of accurately determining the time that has elapsed between a particular survey and a particular service or goods transaction. Accurate knowledge of the time of a particular transaction relative to the time of a customer survey is believed to significantly affect the legitimacy of the survey. Electronic surveying techniques which involve the use of conventional calling cards, for example, suffer from these and other deficiencies.

Pre-paid calling card services are well-known in the art. Such cards are typically purchased from vending machines and the like and come in fixed value increments, for example, $10, $20 arid $50. A $10 card provides the customer with a certain number (e.g., 30) minutes of long distance time from any touch-tone telephone to any location in the United States, regardless of the time of the call; the $20 card provides twice that amount, and so forth. Because the long distance charges are limited to the card's face value, neither the customer nor anyone who obtains possession of the card can run up a large bill.

In operation of the prior art system, cards are batch-activated by the card provider in a limited number of predetermined values. A customer purchases one of these pre-activated cards by paying a fee. The card typically includes a predetermined identification code (which may be obscured by a scratch off material). To use the card, the customer accesses the service (usually through an 800-number), enters the identification code (typically obtained from the back of the card), dials the destination number and the call begins. Prior to dialing, the system may inform the user of a then-current card balance. If during a call the time remaining on the card is about to expire, the customer may be prompted (through a voice over) that only a certain amount of time (e.g., 30 seconds) remains. When the designated time has expired, the call is automatically terminated.

Such systems have proved commercially successful and desirable for several reasons. Pre-paid calling card customers avoid collect and operator assistance surcharges, and they can obtain long distance calling without credit and without payment of monthly bills. The cards themselves are easy to use. While the prior art systems have proven advantageous, they have somewhat limited flexibility. The most significant drawback is the requirement that pre-paid calling cards be issued in fixed or preset amounts. Also, once the time allotted to a particular calling card expires, the card is typically discarded, requiring the customer to carry multiple cards that can be stolen or lost. Existing systems do not have the flexibility to allow the customers to purchase variable amounts of calling time or to recharge "used" cards at the retail site.

There is thus a need for an improved telephone pre-paid calling card system that overcomes these and other problems associated with the prior art, and one which facilitates accurate and meaningful surveying of customer experiences.

BRIEF SUMMARY OF THE INVENTION

It is an object of the present invention to provide a pre-paid card system that includes on-site activation of cards in varying amounts.

It is still another object of the invention to provide a pre-paid card system and method that facilitates point-of-sale activation of cards using data terminals connectable to a host computer.

It is yet another object of the present invention to provide a card system wherein on-site recharging is provided to enable a pre-paid card to be reactivated and re-used following expiration of all, part or none of an initial authorization amount.

It is a further object of the invention to provide a pre-paid card system having a plurality of data terminals remotely connectable to a host computer, each of the data terminals providing on-site point-of-sale activation and recharging of cards in varying amounts. The host computer dynamically manages each of the authorized cards.

It is still another object of the invention to provide a pre-paid card system wherein each authorized card has a security number associated therewith for enabling a host computer to track usage, recharging, recharge locations and similar management information. Preferably cards are authorized or re-authorized for variable amounts although "stale" cards, i.e., cards that have been sold but not used or reauthorized for a predetermined time period (e.g., 6 months) may be purged from the system.

It is still a further object of the invention to provide a pre-paid card system wherein the host computer maintains a database of authorized cards, the database including detailed information about the authorization, recharge and use status of each card in the system.

It is yet another object of the invention to provide a pre-paid card system wherein surveying of customers and locations is selectively conducted upon usage of a pre-paid calling card.

It is still a further object of the invention to provide a pre-paid card system wherein a host computer dynamically selects and alters a survey or survey strategy in response to various system and user-specific criteria.

In one embodiment, a pre-paid calling card system enables customers to access a telephone network and obtain long distance telephone service. The system includes four main functional components: a plurality or calling cards, a host computer, a plurality of activation terminals and a call processor. Each of the calling cards preferably includes a body portion and a read-only memory stripe having stored therein a security number. The card is typically formed of cardboard or plastic and may include the security number in cleartext under a suitable blackout. The main management and processing of the system is effected by the host computer, which is connectable to the telephone network. The host includes a database for storing security numbers associated with authorized calling cards and one or more survey files. The data terminals are remote from the host computer and connectable thereto for transmitting data between the terminals and the host computer. The call processor is controlled by the host computer for interfacing one or more customers to the telephone network using the authorized calling cards.

Preferably, each data terminal includes means (such as a cardreader) for reading a calling card to determine the security number stored in the read-only memory thereof, means (such as a keypad) for entering any monetary amount corresponding to an amount of call authorization associated with a particular calling card, means (such as a modem) for dialing the host computer to transfer the security number, the call authorization amount and the data terminal identification, and means (such as a display) for receiving and displaying a verification message from the host computer authorizing receipt of the monetary amount.

The data terminal allows for variable authorization and recharging of a calling card. When the cardreader cannot detect the security number stored in the memory (which may occur, for example, when the card has been damaged and it is presented for recharging), the data terminal operator may enter the security number using the keypad to enable point-of-sale activation or recharging of the card. By keeping track of the security number and the identification of the authorizing data terminal, the system can generate accounting and/or billing information so that system operator can determine which data terminal operator authorized and/or recharged a particular calling card. This enables the system operator to reconcile all transactions.

In an alternative embodiment of the present invention, a user may activate or recharge a pre-paid card with an authorized dollar amount at a user activation terminal. The pre-paid card may then be used to purchase various goods and services up to the authorized dollar amount. The prepaid card and activation terminals function in the same manner as discussed above with respect to a calling card. The activation terminals are interfaced with a main processor. The main processor includes a host computer responsible for management and processing of the system through a purchasing network. The host computer includes a database for storing security numbers associated with authorized purchase cards and enables users to purchase goods and services up to authorized dollar amounts using the authorized pre-paid cards.

In accordance with another embodiment of the present invention, the system determines whether a particular customer is authorized to participate in an interactive survey upon usage of a calling card or purchase card. A particular survey, as well as the query sequence and content of the survey, may be dynamically selected and altered by the system in response to a number of system and user-specific parameters and factors.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 5 is a flow diagram illustrating various process steps associated with an automated surveying methodology in accordance with an embodiment of the present invention.

Similar reference characters refer to similar parts throughout the several views of the drawings.

DETAILED DESCRIPTION

Figure 1:
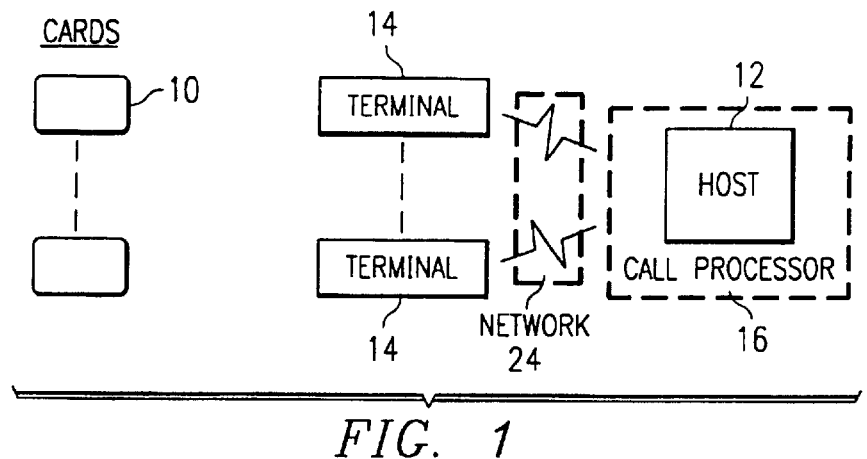
FIG. 1 is a block diagram of the telephone pre-paid calling card system of the present invention.
Figure 2:
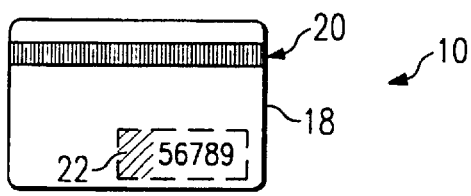
FIG. 2 is a representative pre-paid calling card.

Referring now to the drawings, there is illustrated an exemplary pre-paid calling card system that enables customers to access a telephone network and obtain long distance telephone service. As seen in FIG. 1, the system includes four main functional components: a plurality of calling cards 10, a host computer 12, a plurality of on-site activation terminals 14 and a call processor 16. As seen in FIG. 2, each of the calling cards preferably includes a body portion 18 and a read-only memory stripe 20 having stored therein a security number. The card is typically formed of cardboard, paper or plastic and may include the security number in cleartext under a suitable user-removable scratch-off or other material 22 (such as an opaque tape). If desired, a smart card may be used to store the security number or other information, although preferably the system and method are implemented with so-called "dumb" or nonintelligent cards.

The main management and processing of the system is effected by the host computer 12, which is connectable to the telephone network 24. Although not meant to be limiting, preferably the host computer is a general purpose x86-type personal computer running a multi-tasking operating system such as UNIX. Alternatively, the host computer is implemented with any WINDOWS-based operating system. The host computer has sufficient storage associated therewith to enable a call record to be maintained for every authorized calling card in the system. The call record format will be described below.

Figure 3:
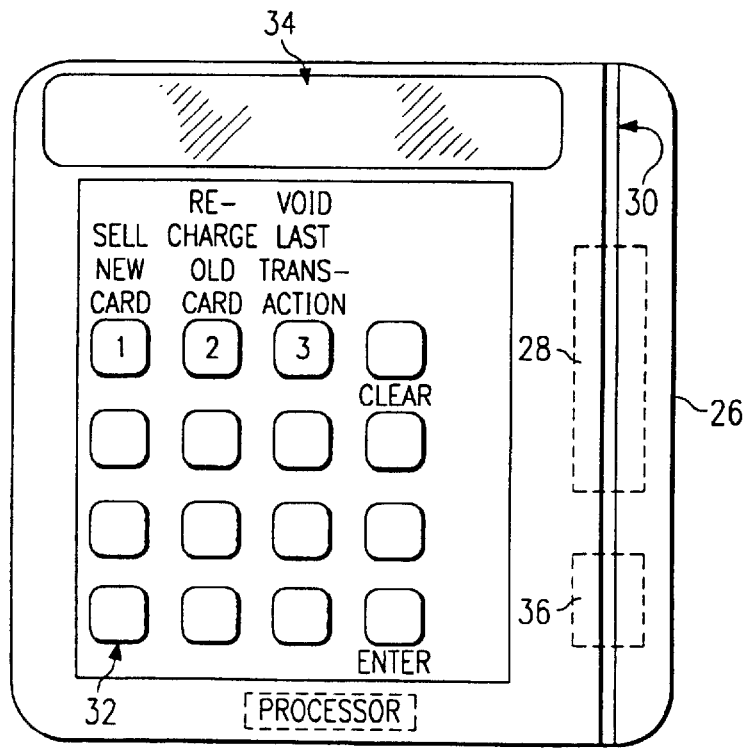
FIG. 3 is a plan view of one of the data terminals of FIG. 1 showing the keypad, display and card swipe component of the unit.

Each of the plurality of on-site activation terminals 14 is preferably a Model XL300 from Verifone, although other models may be used. As seen in FIG. 3, the activation terminal includes a housing 26 in which a number of functional components are included. A cardreader 28 includes a card-swipe slot 30 for receiving the calling card so that the memory stripe can be read. The unit also preferably includes a keypad 32 with various alphanumeric and control keys, and a display 34. The unit also includes a modem 36 (shown in phantom) for connecting the device over a telephone line to the host computer. The activation terminal also includes appropriate control circuitry for controlling the operation of the device.

Each of the terminals 14 is preferably located at a point-of-sale location where the calling cards are sold to users. The calling cards themselves may be stored under the terminal 14 in any convenient fashion. Generally, the data terminals are remote from the host computer and connectable thereto for transmitting data between the terminals and the host computer.

As can be seen, each data terminal 14 includes means (such as a cardreader) for reading a calling card to determine the security number stored in the read-only memory thereof, means (such as a keypad) for entering any monetary amount corresponding to an amount of call authorization associated with a particular calling card, means (such as a modem) for connecting to the host computer to transfer the security number, the call authorization amount and the data terminal identification, and means (such as a display) for receiving and displaying a verification message from the host computer authorizing receipt of the monetary amount. These particular input/output devices of the data terminal are merely exemplary, as other equivalent devices may also be used. For example, the cardreader may be replaced or supplemented with an optical scanner (to read a bar code or the like). When the cardreader cannot detect the security number stored in the memory (which may occur, for example, when the card is presented for recharging), the data terminal operator may enter the security number using the keypad to enable point-of-sale activation or recharging of the card. Likewise, the keypad may be replaced or supplemented with a voice recognition card connected to a microphone for providing limited speaker-independent or speaker dependent discrete or continuous voice recognition. The communications link need not be made over a telephone line, but may be wireless, fiber optic or include any other well-known means for establishing a communications link between two locations. The display itself may be aural as opposed to visual.

The data terminals allow for point-or-sale variable authorization and recharging of calling cards. By keeping track of the security number and the identification of the authorizing data terminal, the system can generate accounting and/or billing information so that system operator can determine which data terminal operator authorized and/or recharged a particular calling card. This enables the system operator to reconcile all transactions.

The call processor of FIG. 1 is controlled by the host computer for interfacing one or more customers to the telephone network using the authorized calling cards. In the preferred embodiment, the call processor includes dedicated hardware and software for interfacing each of the data terminals to the host computer and to the telephone network. The call processor includes a T1 interface card (made by Mitel) which provides an external interface for two digital T1 circuits. In the system, one T1 circuit interfaces to the data terminals, and the other T1 circuit interfaces to the telephone network. Each T1 card has a bandwidth of 24 multiplexed 64 K-bit/second channels. The call processor also includes a number of call processing boards to playback voice files, record voice for other applications such as voice mail, recognize DTMF signaling, outdial DTMF on the outbound portions of each call, and monitor call progress. Preferably each board is a Natural Microsystems Model VBX 1200 (and/or AG24), which includes a digital signal processor, and each such board handles up to 12 or 24 ports, respectively. In operation, each call in the system is assigned a port.

Preferably, each call record established in the system includes a number of pieces of information: the calling card security number, the identity of the store at which the card was issued (i.e., the identification of the authorizing terminal), the card's issue date and time, the card's last use date and time, the card's last recharge store number (i.e., the identify of the data terminal at which the card was last recharged), the card balance ($xxx.xx), the card's last recharge amount, a "card-in-use" flag and the card's last recharge date and time. By keeping track of the data terminals at which a card is initially authorized and later recharged, the system operator can reconcile multiple data from different store locations. This enables the system operator to credit or charge store operators for recharging provided by other store operators in the system.

The operation of the system can now be described. In a preferred call scenario, the possessor of an activated calling card first accesses the service through a dedicated telephone number (such as an 800 number) to which the host computer/call processor are connected. Upon call connection, the user is prompted to enter "security code" from back of card. The host computer checks the database and gives the appropriate response such as "your balance is minutes." Alternatively, the computer may issue a message that "this card was purchased or last recharged more than 6 months ago, please buy more TeleBuck$$^{SM}$ and call again" or "this security code is invalid" as the case may be. If there is a balance, the computer prompts the user to enter the area code and number that the user desires to call. The call is connected and if an answer is detected, the computer keeps track of the minutes used as the call proceeds. If the balance reaches 2 minutes, the caller is warned with a "2 minutes left" message and likewise at 30 seconds. When the balance is exhausted, the computer cuts off in the conversation and plays a message such as "time is up, buy more TeleBuck$$^{SM}$ at any retail location or call us at 1 800 xxx-xxxx for recharge options".

The following is a typical card activation or recharging scenario. Assume a customer comes up to the counter and requests $12 worth of calling time. The clerk then obtains the next calling card from the plurality of cards, and begins the activation process. This is achieved by pressing the "Sell New Card" key (1). The new card is then swiped through the card reader slot. The amount of the transaction is then entered on the keypad. At this point the terminal dials out via the modem and waits for an answer. After communicating with the host, transmitting the request, the card and terminal identifiers, and receiving a verification, the unit displays a suitable response message. The operator is then prompted to collect the funds and this message (e.g., by a message, "Done Collect $xxx.xx") tells the operator that the security number on this card has been activated for the amount shown. The transaction is completed by giving the card to the customer. If the customer desires to pay using a credit card which itself needs to be verified, the data terminal may also be used for this purpose. It should be further noted that the data terminals 14 may be implemented in existing payment terminals such as credit card, ATM or money order machines, and these existing payment terminals may be modified to accept other forms of payment.

Figure 4:
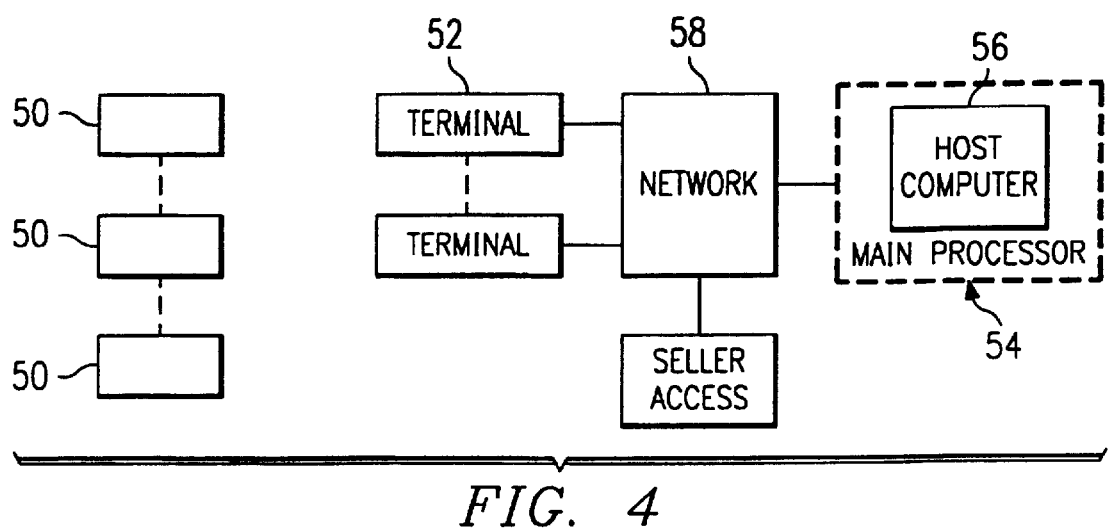
FIG. 4 is a block diagram of an alternative embodiment of the invention utilizing a pre-paid card system for purchasing a variety of goods and services up to an authorized dollar amount.

Referring now to FIG. 4, there is illustrated an alternative embodiment of the present invention wherein there is illustrated a block diagram of a pre-paid card system. Unless otherwise specified, this embodiment functions in much the same manner as the pre-paid calling card system discussed with respect to FIGS. 1 through 3. In this embodiment a variable amount of money is pre-authorized into a card 50. The pre-paid cards 50 include a body position 18 and read only memory stripe 20 having a security number stored thereon as shown in FIG. 2; alternatively, the security number may be the user's account number, a personal identification number (PIN) or some other information generally known only to the user whether encoded on the card 50 or not. The cards 50 may be credit cards, debit cards, smart cards, or any other type of purchasing card which is currently available or may in the future become generally available. The cards 50 are activated or recharged at a plurality of on-site activation terminals 52. The on-site activation terminals 52 have the same hardware and characteristics as the terminal discussed with respect to FIG. 3. The on-site activation terminals 52 interact with a main processor 54 operated by a host computer 56 via any of a variety of types of interconnecting networks 58, for example, a telephone network.

The hardware and software for implementing the main processor 54 and host computer 56 are similar to that discussed with respect to the call processor 16 and host computer 12 of FIG. 1. The host computer 56 contains sufficient storage associated therewith to enable purchase records to be maintained for each authorized card 50 in the system. Preferably, each purchase record established in the system includes a number of pieces of information: the card security number, the identity of the store at which the card was issued (i.e., the identification of the authorizing terminal), the card's issue date and time, the card's last use date and time, the card's last recharge number (i.e., the identity of the data terminal at which the card was last recharged), the purchase balance of the card ($xxx.xx), the card's last recharge amount, the card's last recharge date and time, and transaction codes associated with each purchase. By keeping track of the data terminals at which the card is initially authorized and later recharged, the system operator can reconcile multiple data from different locations. This enables the system operator to credit or charge store operators for recharging provided by other store operators in the system.

The operation of the system may now be described. In a preferred purchase scenario, the user of an activated card makes his purchase of a particular service or good and provides the card to a representative of the selling party. The seller or user is prompted to enter the "security code" from the back of the card 50. The security code may be entered by a magnetic card reader, manual entry or any other well-known method. Entry of the security code enables access to the main processor 54 via a dedicated purchasing network, such as a telephone 800 number or other well-known type of communications method. Additionally, the user may manually enter a personal code (PIN number) known only to the user as an additional security measure. A purchase amount is also entered indicating the amount of a desired purchase. The host computer 56 of the main processor 54 checks the database for the data associated with the codes and notifies the seller and/or user if a sufficient balance is present to make the desired purchase. If a sufficient balance is not available, the host computer 56 may issue a receipt or message indicating the available balance and updated information concerning the purchase record. If a sufficient balance is present, the host computer 56 deducts the entered purchase amount from the card's balance and associates a transaction code with the purchase. The seller then completes the sale to the user. Upon completion of the sale, the user is provided with a receipt indicating the remaining balance on their card 50 or other information relating to their purchase record.

The card activation or recharging scenario is the same as that previously discussed with respect to a pre-paid calling card. The card 50 is activated or recharged with a set dollar amount enabling a user to purchase goods and services up to the pre-paid limit at any location that accepts said card as payment. During a typical card activation scenario, a customer requests an additional balance on the card from an activation terminal 52. This may be done directly by the user or through a clerk manning the terminal. The card is swiped through the card reader slot and the amount to be added to the pre-authorized card balance is entered on the keypad. At this point, the terminal dials out via the modem and awaits a response from the host computer 56. After communicating with the host computer 56 and transmitting the required information, the activation terminal 52 receives and displays a suitable response message. The clerk or user is then prompted to provide the required funds and is informed that the security number on the card has been activated for the amount shown. The transaction is completed by returning the card to the customer.

Another significant advantage realizable through use of a pre-paid calling card system of the type described hereinabove concerns a capability to conduct strategic surveying of calling card users. A surveying system and methodology in accordance with the principles of the present invention obviates the need for manual recordation of various survey parameters associated with conventional electronic surveying techniques.

The inability of prior art systems to accurately determine the time of a customers experience, which may but need not necessarily be, coincident with card activation or recharge relative to the time of the survey is also overcome by employment of a surveying system and methodology of the present invention. The availability of a selected survey for a particular location and card user, as well as the query sequence and content of the selected survey, may be dynamically controlled in response to a number of system and user-specific factors and inputs, as will be discussed in greater detail hereinbelow. The responses obtained from users who are authorized to participate in a particular survey are generally converted to and stored in an ASCII format, although other data formats and storage means may be employed. Various statistical data may be readily obtained by processing the survey data. Some type of consideration, such as a specified number of "free" minutes to be added to the calling card, is typically provided to the user as an incentive to participate in the survey.

Referring now to FIG. 5, there is illustrated various process steps associated with a surveying methodology in accordance with one embodiment of the present invention. A customer or user initially purchases 102 a pre-paid calling card at a particular location, and the card is activated 104 for use or recharged in a manner described previously at a time $t_A$. At some later time, $t_U$, the customer initiates a call or other service/goods transaction. The host computer 56 of the main processor 54 or other processor of the system determines 108, 110 whether surveying is available and whether the particular customer is authorized to participate in a survey based on a number of factors.

The amount of time that has elapsed since the original transaction and the time of card usage (i.e., $t_U-t_A$) may be one such factor. This elapsed time may be of particular significance when the "freshness" of a user's responses with respect to the original transaction is important. The elapsed time may also be used as a factor in selecting one of several potential surveys, and determining the survey content and sequence of a selected survey.

By way of example, if a customer initiates a call or transaction less than 1 hour from the original transaction (i.e., $[t_U-t_A]<1$ hour), a survey $S_1$, which may comprise three sets of questions ($Q_{1-1}$, $Q_{1-2}$, and $Q_{1-3}$), may be selected and executed by the host computer 56. If the elapsed time, $t_U-t_A$, is greater than 1 hour but less than 2 hours, question set $Q_{1-1}$ may be deleted from the survey $S_1$ or, alternatively or in add-on, another question set, $Q_{1-4}$, may be added to the survey $S_1$. If the elapsed time, $t_U-t_A$, is greater than 2 hours but less than 3 hours, survey $S_1$ may be replaced with survey $S_2$ which may comprise two question sets, $Q_{2-1}$ and $Q_{2-2}$. Additionally, the query sequence and content of a particular question set may be selectively altered depending on the elapsed time, $t_U-t_A$. It can be appreciated that the elapsed time between the original or any other transaction and a current surveying transaction may be used alone or in combination with other factors to determine the availability and content/sequence of a particular survey with respect to a particular user or location.

Other factors that may be used to determine whether a particular customer may be authorized to participate in a survey include the location at which the original or other transaction occurred, and when such a transaction occurred. Also, the total number of surveys taken from the original location or other location may be a factor. The total number of surveys taken for a number of locations, such as a chain or group of stores, may also be a factor. Further, the type and nature of the transaction (e.g., card activation, recharge, value of transaction, type of goods/services purchased) and whether a particular card-holder has previously participated in a survey may be additional factors used to determine whether or not a particular user is authorized to participate in a survey.

If a customer is authorized 110 to participate in a survey, the customer is prompted 112 to either accept or decline participating in the survey in exchange for some specified consideration. If the customer agrees to participate in the survey, the host computer 56 initiates the survey routine 114, which typically includes storing and processing 116 various survey parameters such at transaction location, terminal ID, time/date of transaction, etc. A particular survey is selected by the host processor 56 based on the stored survey parameters and other factors such as those described previously. It is understood that activation of a survey need not be based on, or dynamically altered in response to, any, some or all of these considerations. A pre-established or selected survey may simply be initiated in response to agreement by a customer to participate in the survey. It is believed, however, that the aforementioned parameters and factors may be used to develop and execute a strategic surveying procedure that can be dynamically altered in response to various system and user-specific criteria.

After a survey has been selected 118, which may be a default survey, the selected survey is executed 120 and the customer's responses are stored 122 in the database. It is noted that the host computer 56 may dynamically alter the survey sequence or content in response to the customer's responses. Upon completion of the survey, the customer may be notified 124 that the customer will be credited with x number of calling minutes, y dollars, or be given some other form of consideration. A tiered system of consideration may also be implemented in which the customer receives additional consideration for participating in additional surveys or for answering a greater number of questions.

If the system determines 108 that the automated surveying procedure is not operational, or that surveying is not authorized 110 for the customer, or that the customer declines 112 to participate in the survey, the customer may, if applicable, be provided 126, 128 with other authorized or requested services. If the customer completes 124 the surveying procedure, the system determines 126 whether such other services are authorized or requested. If not, the customer call or transaction is terminated 130.

A typical survey applicable to a retail store or chain or stores is provide below for purposes of illustration and not of limitation. It is understood that the content and sequence of a particular survey may be developed to query customers on a wide range of topics and for a number of different purposes (e.g., customer satisfaction, product preference, etc.).

Customer Profile:
(System Voice/visual Prompts)
  Thank you for taking this survey.
  1. Please enter your age in number of years.
  2. Please enter the number of times per week that you shop at any convenience store.
  3. Please enter the number of times per week that you shop at the store where you bought your pre-paid calling card.
  4. Please enter 1 if you are male, 2 if you are female.
Cashier Performance:
(System Voice/visual Prompts)
  The following are a few questions about your experience at the store where you bought your pre-paid calling card. Try to answer the questions with that specific trip to the store in mind.
  1. How friendly were the people in the store? Enter 1, 2, or 3, with 1 being very friendly, 2 being average, and 3 being unfriendly.
  2. When you brought your purchase to the cashier's counter, how long did you have to wait to have your sale rung at the cash register? Enter 1 if less than one minute, 2 if less than 2 minutes, 3 if longer than 5 minutes.
  3. Did your cashier ask if you wanted to purchase any kind of lottery game? Enter 1 for Yes, 2 for No.
  4. Did your cashier give you a receipt? Enter 1 for Yes, 2 for No.
Cleanliness/Appearance:
(System Voice/visual Prompts)
  1. Was the outside of the store clean? Enter 1, 2, or 3, with 1 being very clean, 2 being average, and 3 being unclean.
  2. Was the inside of the store clean? Enter 1, 2, or 3, with 1 being very clean, 2 being average, and 3 being unclean.
  3. Were all of the store employees wearing smocks or uniforms? Enter 1 for Yes, 2 for No.
  4. Did you find your merchandise easily and quickly?. Enter 1 for Yes, 2 for No.
Customer Wish List:
(System Voice/visual Prompts)
  1. What influences you most to shop at any convenience store? Enter 1 if it is the price of fuel, 2 if it is the price of other goods at the store, 3 if it is the location of the store, or 4 if some other factor influences you to shop at one convenience store over another.

2. Do you ever wish you could stop at our store, but find that we are closed? Enter 1 for Yes, 2 for No.
3. If we had a "Frequent Fueler" program that offered you a discount for filling your tank with us more often, would you use it? Enter 1 for Yes, 2 for No.

For purposes of further illustration, a description of a typical survey transaction from a system perspective is provided below. Initially, a customer enters his or her card security code. The host computer 56 then determines from the security code whether the customer is eligible for surveying. If eligible, the customer hears the message "For X free minutes, take a short Y question survey, press** to start the survey or just enter the area code and number you are dialing to reject the survey and complete your call." If the customer declines, the system responds as follows:

1. Play the message "Survey declined".
2. Change the survey status from "E" (eligibility level 1) to "R" (rejected one time).
3. Change the survey status from "F" (eligibility level 2) to "S" (rejected two times).
4. Change the survey status from "G" (eligibility level 3) to "T" (rejected three times).
5. Write a survey transaction record with the status "R", and the start survey time.
6. Put the call through as normal.

If the customer agrees to participate in the survey, the system responds as follows:

1. Log the start survey time.
2. Play the introductory message on surveying.
3. Play each question one at a time and wait for a response.

If the customer hits the "" key, the system replays the questions (only once, any more times and the survey is considered incomplete). If the customer does not hit the "#" key after each answer, the system processes the keys which the customer did enter. If the customer hangs up or does not answer a critical question, the system responds in the following manner:

1. Mark the survey status as "I" (incomplete).
2. Mark the stop survey time.
3. Write a survey transaction record.
4. Play the message "We are sorry, your survey was not completed successfully."

The system requests the customer to enter their area code and destination number as normal. If the customer answers the questions as stated, the system responds as follows:

1. Increment the number of surveys taken for the store.
2. Increment the number of surveys taken for the company.
3. Change the card survey status to "D" (done).
4. Mark the stop survey time.
5. Write a survey transaction record with status "C" (completed).
6. Add the proper amount of minutes to the customer's card balance.
7. Play the message "Thank you. X minutes of time was credited to your calling card.
8. Request entry of customer's area code and destination number as normal.

The process of establishing the various eligibility levels recited above is provided hereinbelow for both original card activation and recharge procedures. The system initiates the following logic to establish eligibility status upon card sale and activation:

1. Is the company which owns the store surveying all stores?
2. Is the company which owns the store surveying select stores and this store is one of them?
3. Is the company surveying at all?
4. Is the company surveying activations?
5. Is this sale the "nthcardgo" sale for the company?
6. If the answer to questions 1–5 is "yes" then the eligibility status is modified to "E" (eligibility level 1).

The system initiates the following logic to establish eligibility status upon card recharge:

1. Is the company which owns the store surveying all stores?
2. Is the company which owns the store surveying select stores and this store is one of them?
3. Is the company surveying at all?
4. Is the company surveying recharges?
5. Is this sale the "nthcardgo" sale for the company?
6. If not the "nthcardgo" for the company, modify the eligibility status as follows:
7. If current status is "R" (rejected once), change to "F" (eligibility level 2).
8. If current status is "S" (rejected twice), change to "G" (eligibility level 3).
9. If the answer to all the above questions is "yes" then modify the eligibility status as follows:
10. If current status is "R" (rejected once), change to "F" (eligibility level 2).
11. If current status is "S" (rejected twice), change to "G" (eligibility level 3).
12. If current status is "E" (eligibility level 1), "F" (eligibility level 2), or "G" (eligibility level 3), do not change the eligibility status.
13. If current status is "D" (done), change to "E" (eligibility level 1).
14. If current status is "9" (untouched), change to "E" (eligibility level 1). The system initiates the following logic to establish eligibility status upon card usage:
1. Is the survey status of the card "E" (eligibility level 1), "F" (eligibility level 2), or "G" (eligibility level 3)?
2. Is the update store found in the st_dbase?
3. Is the company which owns the store found in the co_dbase?
4. Is the company currently doing surveying? (co_dbase)
5. Is the current date within the start date and stop date for surveying for the company? (co_dbase)
6. Has the company already been surveyed the maximum number of times which was specified for the company? (co_dbase)
7. Is surveying turned on for all stores? (co_dbase)
8. If surveying is not turned on for all stores, is surveying turned on for this update store? (st_dbase)
9. Has the store already been surveyed the maximum number of times which was specified for the store? (st_dbase)
10. Is the amount of time that has elapsed between the time of the sale and the time of this call shorter than the specified maximum time for the company? (Co_dbase)

It is to be understood that the system logic described hereinabove is intended to illustrate one of many survey strategies that may be implemented by a pre-paid calling card system that operates in accordance with the principles of the present invention. The specific examples provided hereinabove are not be construed so as to limit the invention to a particular type, nature, or manner of executing a given survey within the context of the disclosed system.

It is to be further noted that while the present invention has been described with respect to providing a pre-paid calling card system or a pre-paid card system which includes a sophisticated surveying capability, that the purchase of any goods, service or activity may utilize the pre-paid card system of the present invention as an alternative to pay-as-you-go or credit services.

It should be appreciated that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What we claim is:

1. A method to enable customers to obtain pre-paid calling card accounts from a plurality of point-of-sale locations and to use the pre-paid calling card accounts to access a telephone network using a telephone and to participate in an automated survey, the method comprising:

transferring activation information associated with one or more pre-paid calling card accounts from a data terminal located at a particular one of the point-of-sale locations to a remote location having a database of pre-paid calling card accounts, the activation information being used to identify the one or more pre-paid calling card accounts, the one or more pre-paid calling card accounts being associated with a distributor of the one or more pre-paid calling card accounts;

activating the one or more pre-paid calling card accounts in the database of prepaid calling card accounts in response to receipt of the activation information for the particular point-of-sale location by associating active call authorization amounts with one or more pre-paid calling card accounts;

receiving access information transferred form at telephone to a call processor having access to the database of pre-paid calling card accounts, the call processor using the access information to establish a telephone call from the telephone to a desired number using the telephone network;

determining whether automated surveying of a user is authorized;

conducting the automated survey and storing user inputs; and upon completion of the automated surveying, reducing the active call authorization amount associated with the particular one of the one or more pre-paid calling card accounts in correspondence with usage of the telephone network.

2. The method of claim 1, further comprising:
    rewarding the user upon completion of the automated survey.

3. The method of claim 2, the step of rewarding comprising:
    crediting an additional call authorization amount.

4. The method of claim 2, further comprising:
    terminating access to the telephone network when the active call authorization amount is exhausted.

5. The method of claim 1, further comprising:
    terminating access to the telephone network when the active call authorization amount is exhausted.

6. A system for distributing and managing pre-paid calling card accounts from any one location from a plurality of point-of-sale locations and conducting an automated survey, the accounts used to access a telephone network, the system comprising:

a database of pre-paid calling card accounts located remotely from the plurality of the point-of-sale locations;

a data terminal located at the one location, the data terminal transferring activation information associated with one or more of the pre-paid calling card accounts from the one location to the remote location;

the activation information being used to identify one or more pre-paid calling card accounts, the one or more pre-paid calling card accounts being associated with a distributor;

a processing unit coupled to the database of pre-paid calling card accounts, the processing unit activating one or more pre-paid calling card accounts in the database of pre-paid calling card accounts in response to receipt of the activation information for the one or more calling card accounts by associating active call authorizing amounts with the one or more calling card accounts;

a call processor coupled to the database of pre-paid calling card accounts and to the telephone network, the call processor receiving access information used to identify a particular one of the one or more pre-paid calling card accounts;

the call processor further determining whether an automated survey of the user is authorized, conducting the automated survey and storing user inputs; and the call processor further reducing the active call authorization amount associated with the one of the one or more pre-paid calling card accounts in correspondence with usage of the telephone network to enable a telephone call from the telephone to a desired number using the telephone network.

7. A system as recited in claim 6, where said call processor further rewards users upon completion of the automated survey.

8. A system as recited in claim 7, where said reward is to credit an additional call authorization amount to the particular pre-paid calling card account.

9. A system as recited in claim 7, where said call processor further terminates access to the telephone network upon exhaustion of active call authorization amount.

10. A system as recited in claim 6, where said call processor further terminates access to the telephone network upon exhaustion of active call authorization amount.

* * * * *